(12) United States Patent
Amrany et al.

(10) Patent No.: US 6,711,207 B1
(45) Date of Patent: Mar. 23, 2004

(54) SYSTEM AND METHOD FOR REDUCED POWER CONSUMPTION IN DIGITAL SUBSCRIBER LINE MODEMS

(75) Inventors: Daniel Amrany, Wayside, NJ (US); William H. Scholtz, Middletown, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/523,637

(22) Filed: Mar. 13, 2000

Related U.S. Application Data
(60) Provisional application No. 60/123,829, filed on Mar. 11, 1999.

(51) Int. Cl.[7] .............................. H04B 1/38; H04L 5/16
(52) U.S. Cl. ..................... 375/222; 375/219; 375/224; 375/259
(58) Field of Search ................................ 375/219, 220, 375/222, 260, 261, 295, 298, 259; 455/522, 13.4

(56) References Cited

U.S. PATENT DOCUMENTS

| | | | | |
|---|---|---|---|---|
| 4,937,844 A | * | 6/1990 | Kao | 375/240 |
| 5,291,521 A | * | 3/1994 | Betts et al. | 375/295 |
| 5,560,020 A | * | 9/1996 | Nakatani et al. | 713/322 |
| 6,034,991 A | * | 3/2000 | Zhou et al. | 375/222 |
| 6,092,095 A | * | 7/2000 | Maytal | 709/100 |
| 6,266,376 B1 | * | 7/2001 | Pilozzi et al. | 375/254 |
| 6,310,909 B1 | * | 10/2001 | Jones | 375/220 |
| 6,430,219 B1 | * | 8/2002 | Zuranski et al. | 375/231 |
| 6,445,733 B1 | * | 9/2002 | Zuranski et al. | 375/231 |
| 6,457,037 B1 | * | 9/2002 | Maytal | 709/100 |
| 6,507,585 B1 | * | 1/2003 | Dobson | 370/420 |
| 6,549,512 B2 | * | 4/2003 | Wu et al. | 370/210 |
| 2002/0172146 A1 | * | 11/2002 | Wu et al. | 370/208 |

* cited by examiner

*Primary Examiner*—Jean B. Corrielus
(74) *Attorney, Agent, or Firm*—Thomas, Kayden, Horstemeyer & Risley (57) ABSTRACT

The present invention is directed to a system and method that detects periods of no activity in the downstream data path of a DSL modem and reduces the transmit power in the output line driver to reduce power consumption in the modem. A preferred method is operative at the central office DSL modem and comprises detecting periods of no activity in the downstream data bins, reducing the transmit power in response to the inactivity on the communication link, detecting either upstream or downstream data, and performing a fast retrain of the modem to restore nominal power data transmission in the downstream direction. A variation of the preferred method uses a reduced point constellation encoding scheme to reduce power consumption. Broadly, the system of the present invention may be realized by a configurable transmit channel line driver and a digital signal processor.

33 Claims, 8 Drawing Sheets

FIG. 1

(PRIOR ART)

SYSTEM AND METHOD FOR REDUCED POWER CONSUMPTION IN DIGITAL SUBSCRIBER LINE MODEMS

CROSS-REFERENCE TO RELATED APPLICATION

The present application claims the benefit of co-pending U.S. provisional patent application, Ser. No. 60/123,829, filed Mar. 11, 1999, which is hereby incorporated by reference in its entirety.

BACKGROUND OF THE INVENTION

1. Field of the Invention

The present invention generally relates to communication systems, and more particularly, to a system and method for reduced power consumption in digital subscriber line modems.

2. Discussion of the Related Art

In recent years, telephone communication systems have expanded from traditional plain old telephone system (POTS) communications to include high-speed data communications as well. As is known, POTS communications include the transmission of voice information, control signals, public switched telephone network (PSTN) information, as well as, information from ancillary equipment in analog form (i.e., computer modems and facsimile machines) that is transmitted in the POTS bandwidth.

Prompted largely by the desire of large businesses to reliably transfer information over a broadband network, telecommunications service providers have employed digital subscriber lines (DSL) to provide a plethora of interactive multi-media digital signals over the same existing POTS twisted-pair lines.

The provision of DSL services to customer premises has proliferated over recent years. DSL services are typically provided to remotely located customer premises by equipping both the appropriate central office and the customer premises with compatible DSL modems. DSL modems communicate by modulating a baseband signal with customer desired service signals, converting the modulated digital data signal to an analog signal, and transmitting the analog signal over the conventional copper wire pair provided in the PSTN from a central office to a customer premises via a carrier service area (CSA) loop. Well known data modulation and transmission techniques include mapping digital data to be transmitted into a multi-dimensional multilevel signal space constellation and decoding the received constellation to recover the transmitted information.

Once compatibly configured modems are integrated with the PSTN and "trained" to the particular response characteristics of the particular CSA local loop of the PSTN on which they communicate, they can provide a digital communications link from the customer premises to multiple digital information and communications services.

DSL communication links differ from analog or "dial-up" modem links in that the DSL link is designed to provide 24 hour/7 days a week network connectivity. On the other hand, "dial-up" modem links are more temporary in nature as they provide network connectivity upon customer demand. Full-time availability of the DSL link and the requirement for dedicated DSL equipment at the central office to service each DSL service customer result in unnecessary power consumption during those periods when the customer is not actively using the DSL link.

A major component of the total power consumption within a DSL modem is consumed by the line driver, as line driver power consumption overwhelms power consumed by digital signal processing in multiplexing, modulating, and converting the multiple DSL service input signals. As a result, output line driver power consumption is an area of concern when focusing on decreasing power consumption in DSL modems.

DSL modems use a number of different modulation schemes and rates. Asymmetric digital subscriber line (ADSL) systems adopted discrete multi-tone (DMT), a rate adaptive and tone flexible multi-carrier data transmission method. Other DSL systems use more traditional line coding methods, such as, quadrature amplitude modulation (QAM) and carrierless amplitude/phase modulation (CAP). Despite the modulation technique of choice, DSL modems are subject to time intervals when customers do not demand downstream (central office to customer premises) data transmission.

DMT systems, by nature of their distribution across multiple frequency bands, are capable of retuning modems to optimize data transfer for changing line conditions. DMT devices selectively transfer bits from the data stream in those discrete frequency bands that are uncorrupted from amplitude modulation radio interference and unaffected by phone system bridge taps, thereby tuning, or maximizing performance under changing line conditions.

Tuning of DMT system parameters is currently performed in two distinct ways: initial training, hereinafter called, "full retrain," and bit loading/swapping, an online optimization procedure. Another often suggested means to retune a system is a fast retrain of the connection. "Full retrain" of a DSL link results in a temporary loss of service and is undesirable under most conditions. Of the methods used to tune DMT parameters, fast retrain is best suited to overcome transient effects, while bit loading/swapping is more adapted to slowly varying changes. The fast retrain method is more robust than bit loading/swapping and provides for a more optimized system since it can actively readapt other system components such as equalizers and echo-cancelers to the actual noise environment of the communication channel.

A fast retrain algorithm may be triggered when either the central office or the remote transmission unit sense the need to transition from the current parameter profile to a more appropriate previously stored parameter profile. The most typical situation that triggers a fast retrain is when a POTS device goes on/off hook. These transitions create impedance transients that adversely affect the ADSL frequency spectra.

Fast retrain procedures are usually based upon stored profiles. It is assumed that previous full initialization procedures have been successfully completed upon earlier off-hook and on-hook transitions of POTS equipment at the customer premises. If the full initialization profile under such conditions has been stored in memory, a fast retrain can take advantage of that previous work by identifying current line conditions, recognizing if a suitable profile exists in memory, and simply recalling and applying stored profile parameters.

Before a central office DSL modem can exchange information with a remotely located DSL modem, clock timing and synchronization between the central office modem and the remote DSL modem master clock must be established. Timing and synchronization are fundamental to any digital transmission and switching network and should be maintained in order to minimize delays when resuming downstream data transmission. In a digital transmission system, timing is encoded with the transmitted signal using a network master clock. As such, the central office DSL modem must recover system timing and synchronization from this system clock. Once frequency synchronization between the central office modem and the network clock is achieved, the modem can identify frame boundaries of both the received and transmitted signals.

SUMMARY OF THE INVENTION

Accordingly, it is desired to provide a system and method that timely, efficiently, and accurately detects periods of non-use of the downstream data path in a DSL communications link, adjusts the output line driver to decrease power consumption while maintaining the necessary timing relationship between the central office and remote DSL modems to permit timely resumption of full downstream service.

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a method for detecting periods of non-use of the downstream data path in an established DSL communications link; reducing the power consumed in the output line driver of the central office modem during the period of non-use; while concurrently maintaining the necessary timing relationships between the modems. For DMT applications, a method consistent with the concepts of the present invention may also adjust the processing clock for the digital signal processor (DSP) and the analog to digital (ADC) and digital to analog converters (DAC) in the central office modem to further reduce power consumption at the central office during periods of non-use. Once the central office DSL modem has been reconfigured for reduced power operation, the method continuously searches for both upstream and or downstream signal information. Upon detecting data transmission activity in either direction, the DSL modem may perform a fast retrain to return to a full power data transfer mode.

A system consistent with the aforementioned method may be implemented with modified code and any of a number of hardware configurations capable of reducing the voltage supplied to the output line driver. This first method can be implemented by modifying code and hardware at the central office only.

Another method consistent with the concepts of the present invention introduces a "stand-by" processing mode that both the central office and the customer premises modems would understand. This method may be implemented by modifying code in both the central office and customer premises modems and by modifying hardware in the central office modem (to reduce the voltage supplied to the output line driver as in the first method).

The stand-by mode method introduces an additional step to the method cited above. When in stand-by mode, the central office modem transmits a reduced point constellation coded signal. In this way, the timing relationship between the two modems can be maintained and data mode can be resumed much more quickly than if the modems were required to perform a fast retrain to establish a full data mode communications link.

The methods introduced above for DSL systems that use the DMT data transmission scheme can be applied with modification to DSL systems that use CAP modulation schemes as well. In this regard, the first method may be modified to use the stand-by and "warm start" functionality provided in RADSL. The second method may be modified such that in stand-by mode the central office modem is configured to transmit band edge tones in order to maintain timing recovery. The central office modem can initiate data mode simply by sending the pseudorandom noise (PN) sequence.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
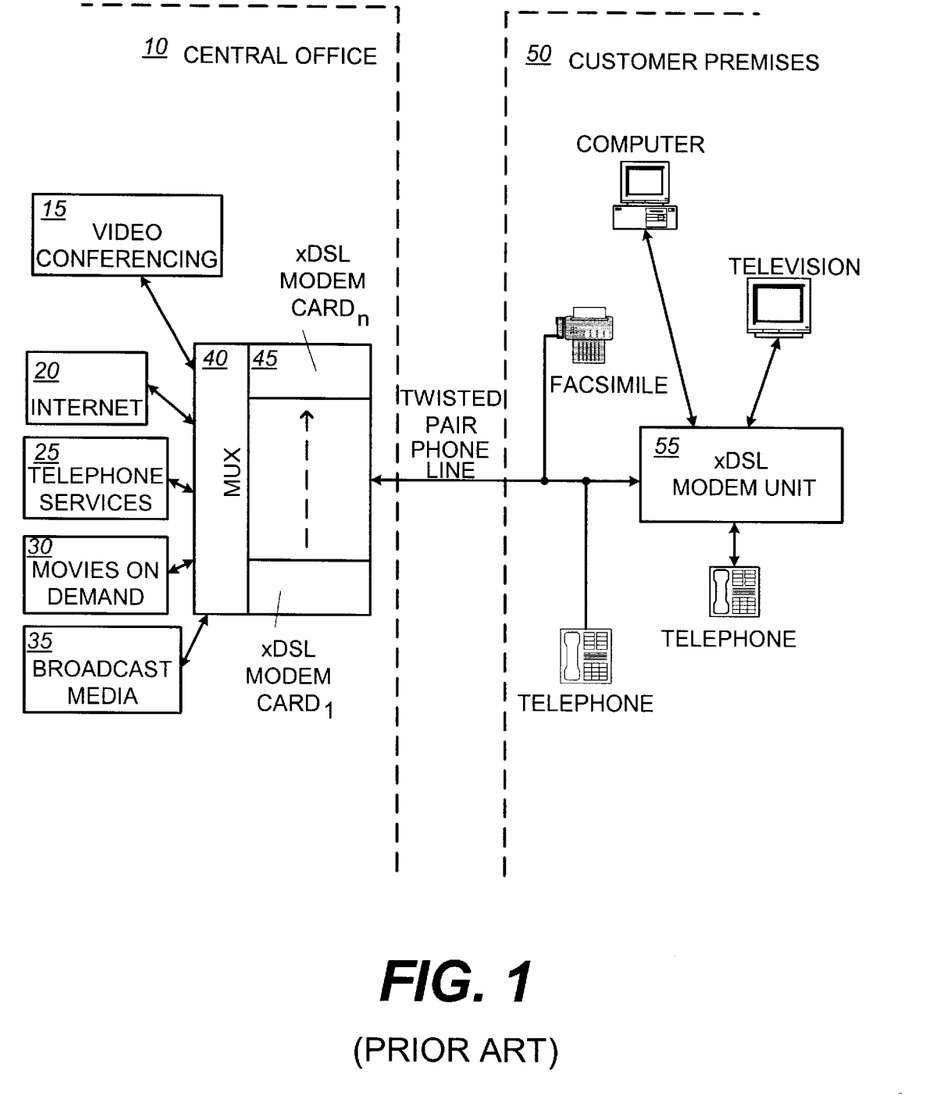
FIG. 1 is a block diagram illustrating the delivery of multiple broadband services via a communications system on a telephone line.

Turning now to the drawings, reference is made to FIG. 1, which illustrates the delivery of broadband communication services via a xDSL communications system over the POTS network. In this regard, a central office 10 is configured to receive broadband services which it assembles via central office xDSL modem cards 45 for transmission over a POTS twisted-pair phone line to a customer premises 50. Examples of such broadband services are depicted as video conferencing 15, Internet 20, telephone services 25, movies on demand 30, and broadcast media 35. Central office 10 assembles signals from the aforementioned broadband services via mux 40 for appropriate transformation and transmission by xDSL modem cards 45.

Customer premises 50 has a compatible xDSL modem unit 55, which processes and distributes the several services to appropriate destination devices such as a computer, television, a facsimile machine, and a telephone as illustrated. It is significant to note that customer premises 50 may have POTS devices such as the facsimile machine and another telephone integrated on the PSTN line along with xDSL modem unit 55. On/off hook impedance transitions introduced by POTS devices such as the telephone and the facsimile machine illustrated in FIG. 1 can interrupt xDSL communications that must traverse the same PSTN line. It should be understood that the circuitry conventionally implemented in, for example, a xDSL transceiver will be included within xDSL modem cards 45 and xDSL modem unit 55 as shown in FIG. 1. The implementation of such circuitry will be appreciated by persons skilled in the art, and need not be described herein.

Figure 2:
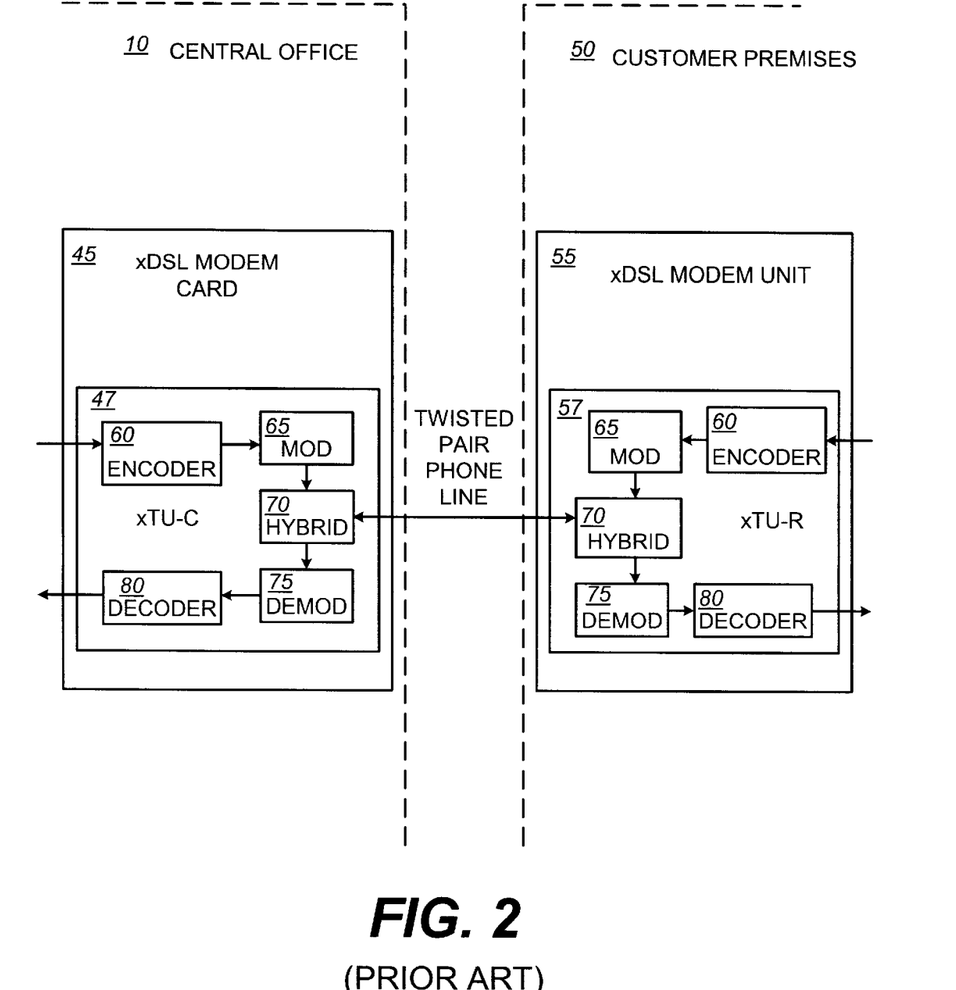
FIG. 2 is a block diagram further illustrating a communications system in accordance with FIG. 1.

Having provided a top level description of a communications system configured to deliver a multitude of broadband services, reference is now made to FIG. 2, which illustrates a portion of a xDSL modem card 45 and a xDSL modem unit 55 as shown in FIG. 1. In this regard, xDSL modem card 45 contains a xDSL modem unit—central office, hereinafter ATU-C 47. Similarly, xDSL modem unit 55 contains an xDSL transmission unit—remote, hereinafter ATU-R 57. Both ATU-C 47 and ATU-R 57 serve to enable two-way communications between xDSL modem card 45 and xDSL modem unit 55 via the PSTN. Since each ATU is similarly configured, the description herein will address the five functional blocks only once. Both ATU-C 47 and ATU-R 57 receive digital data in encoder 60. Encoder 60 processes the digital data and forwards it to modulator 65, which adaptively applies the digital data across the DMT frequencies. Modulator 65 then forwards a multitude of designated spread spectrum frequencies to hybrid 70 for data transmission along the PSTN line. In the manner described above, data is assembled, adaptively applied, and transmitted from one xDSL device to another across is each of the separate DMT channels as the physical characteristics of the environment surrounding each individual system allows.

Whereas ADSL uses DMT as the data modulation scheme, other known modulation schemes can be applied in xDSL communications systems as well. As by way of example, DSL communication systems may use Carrierless Amplitude Modulation/Phase Modulation (CAP) or Quadrature Amplitude Modulation. Such data modulation schemes are within the scope of the present invention.

Similarly, hybrid 70 is configured to receive a multitude of spread spectrum frequencies from the remote xDSL transmission unit along the PSTN line. Hybrid 70 forwards designated spread spectrum frequencies to demodulator 75. Demodulator 75 processes the set of spread spectrum frequencies to remove digital data. Demodulator 75 forwards the digital data to decoder 80. Decoder 80 processes the digital data and distributes it to the appropriate broadband device.

In a communications system utilizing DMT, there are a variety of xDSL protocols that serve to coordinate the functions of individual units in the system. One such signal is the two-tone signal, C_RECOV. Upon detection of a C_RECOV signal, ATU-R 57 configures itself for a fast retrain.

Fast retrain procedures assume that the communication system has suitable memory, that the system has the capability of implementing a fast retrain procedure, and that the system can implement a recognition device for the stored profiles. More precisely, fast retrain procedures require that off-hook and on-hook conditions have been encountered that have triggered full retrains and that the system has found and stored in memory a set of system parameters that permit successful data transmission under such conditions. Fast retrain procedures further require the system to match the stored parameter sets with the present line situation. That is, the system must have an algorithm that will selectively choose a stored profile that matches the current line situation. If no profile matches the current situation, the system must also be able to trigger a full retrain of the system.

DMT standards currently support the storage of 16 profiles. The profiles contain B & G tables (bins or tones used and the power of each), forward error correction parameters R & S, interleaver depth, D, power spectral density level, and distinctive features that uniquely describe the link state to enable a simplified selection of a link state.

Some embodiments consistent with the method of the present invention may use both fast retrain and full retrain algorithms in order to transition from data mode to a reduced power configuration. Similarly, both fast retrain and full retrain algorithms may be implemented in order to transition from the reduced power mode to a standard data transfer mode.

Full Initialization at Central Office

Figure 3:
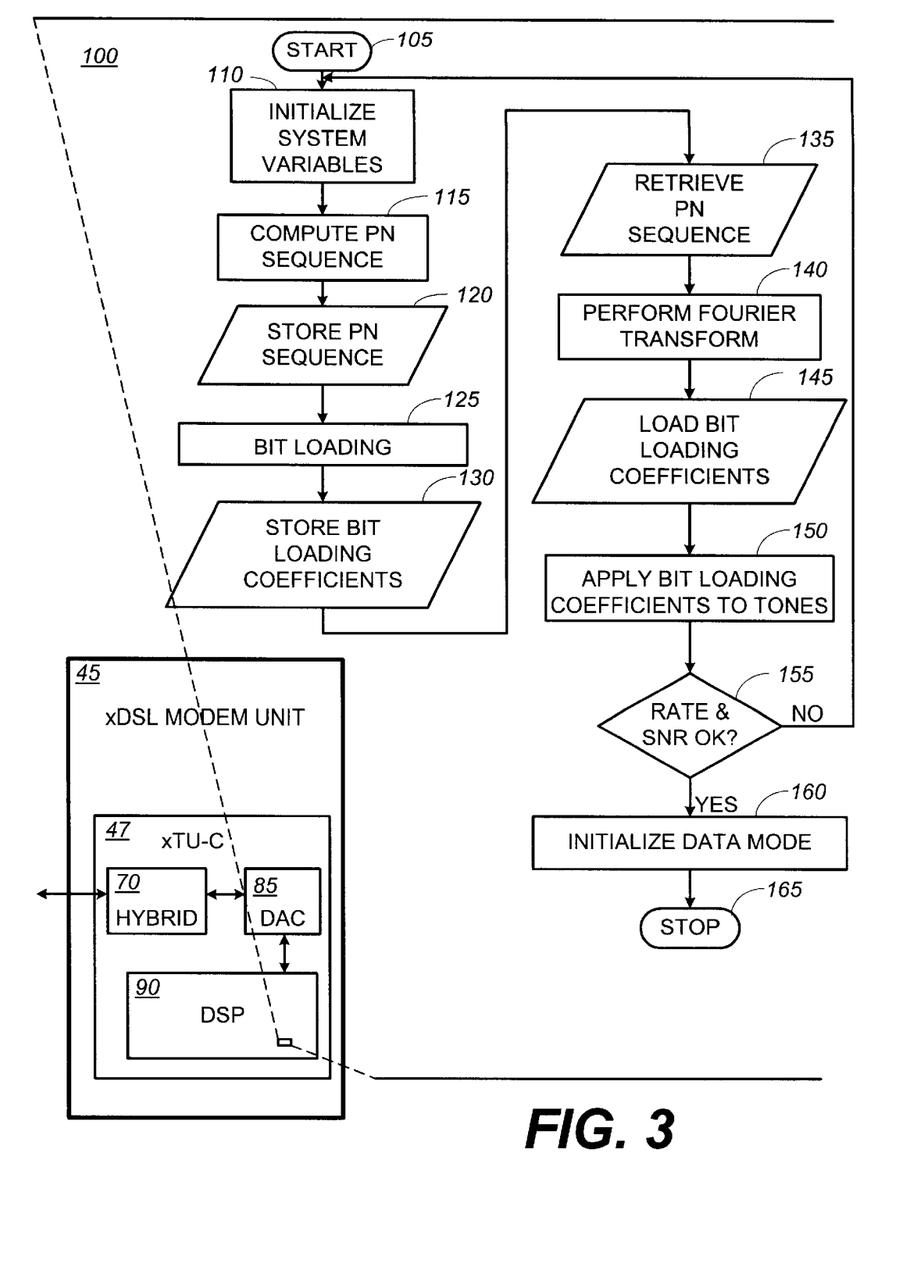
FIG. 3 is a block diagram of a xDSL modem that illustrates the method steps of a full initialization procedure whereby a system profile is stored in a communications system in accordance with FIG. 2.

Reference is now made to FIG. 3, which illustrates a xDSL modem unit 45 with a xTU-C 47 that performs a full system initialization at central office 10 (see FIG. 2) in order to store a system profile and train both modems of a DSL link pair. When either central office 10 or xTU-R 57 (see FIG. 2) command a full retrain of the communication system, hybrid 70, digital to analog converter (DAC) 85 and a digital signal processor (DSP) 90 within ATU-C 47 receive and process the full retrain command. Digital signal processor 90 can be configured to perform any of a number of necessary functions in order to coordinate the two-way transmission of broadband data in a DSL communication system. As illustrated in FIG. 3, the DSP 90 may perform a full system initialization procedure by performing the method steps illustrated in method 100. Method 100 starts in step 105, designated "start." Method 100 initializes system variables in step 110. The xDSL modem then, computes a PN received sequence derived from data received from ATU-R 57 (see FIG. 2) in step 115. Next, in step 120, the DSP 90 stores the PN sequence computed in step 115. The DSP 90 continues the full retrain process by performing a bit loading procedure in step 125, whereby ATU-C 47 determines an efficient and effective means of receiving the xDSL data stream across each of the spread spectrum frequencies in the DSL communication system. Depending on line conditions, external interference, and line attenuation over frequency, bits from the xDSL data stream are selected for application across the individual tones. After selecting bit loading coefficients in step 125, the DSP 90 stores the bit loading coefficients in step 130.

After retrieving the PN sequence from memory in step 135, the DSP 90 performs a Fourier transform of the received PN sequence. In step 145, the DSP 90 loads the bit loading coefficients previously stored in step 130. In step 150, the system applies the bit loading coefficients across select tones to enable an efficient data transfer between the xDSL modem pair given present communication channel features. Having selected and applied system profile coefficients, the xDSL modem units 45 verifies the selected profile is suitable for XDSL data transmission before signaling ATU-R 57 (see FIG. 2) that ATU-C 47 has successfully completed the full system initialization and is ready for data transmission. In this regard, data transfer rate and signal to noise ratio (SNR) verifications may be performed in step 155 before notifying the xTU-R 57 that the xTU-C 47 is prepared for data mode in step 160. If the data transfer rate and SNR verification performed in step 155 does not meet system requirements, the process may return to step 110 and the full retrain procedure repeated. It is important to note that while ATU-C 47 is performing the method steps illustrated above to adjust for the reception of upstream data, ATU-R 57 may be simultaneously performing similar steps in order to adjust for downstream data transmission. The DSP 90 then terminates the full retrain procedure by performing step 165, designated, "stop."

Fast Retrain at Central Office

Figure 4:
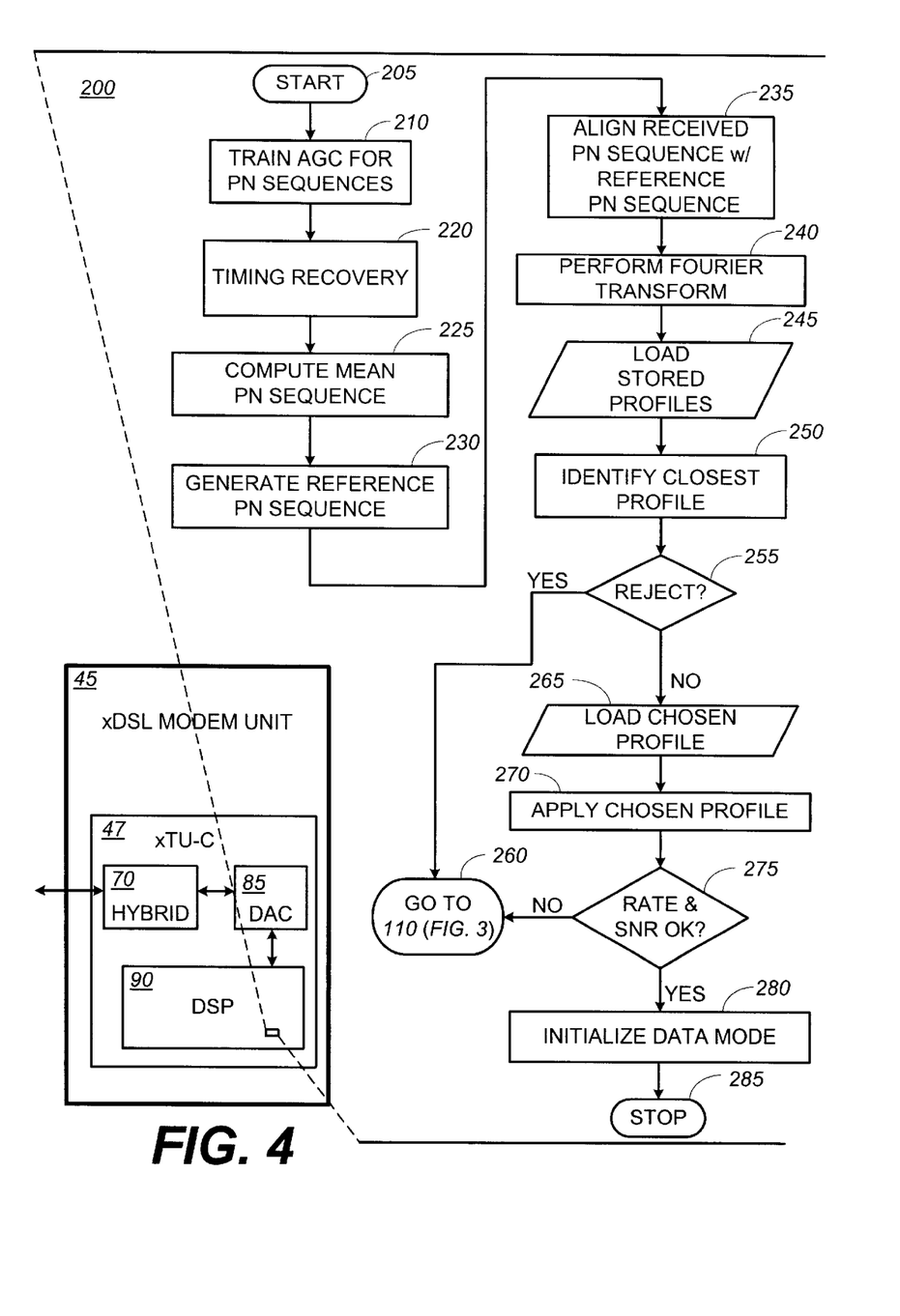
FIG. 4 is a block diagram of a xDSL modem that illustrates the method steps of a fast retrain procedure whereby stored profiles are applied to quickly reconfigure both DSL modems in a communication system in accordance with FIG. 2.

Having described the full initialization process at central office 10 whereby a system profile is generated, stored, and applied within DSP 90, reference is now made to FIG. 4 which illustrates a fast retrain procedure. As illustrated in FIG. 4, the DSP 90 may perform a fast retrain by performing method 200.

Method 200 begins with step 205, designated, "start." Method 200, adjusts the automated gain control (AGC) in the receive data path in step 210 in response to the received PN sequences. DSP 90 then performs timing recovery in step 220. While a PN sequence is being sent by xTU-R 57, xTU-C 47 averages the received symbols in the time domain in step 225. During this time, central office 10 is quiet or sending one or more pilot tones. The xDSL standard PN sequence is generated by the following algorithm repeated for illustration:

$$d_n = 1 \quad \text{for } n = 1, 2, \ldots, 6$$

$$d_n = d_{n-5} \oplus d_{n-6} \quad \text{for } n = 7, 8, \ldots, 64$$

Bits $d_1$ to $d_6$ are reinitialized for each DMT symbol so that each PN sequence symbol uses the same data. The first pair of bits ($d_1$ and $d_2$) are used for the direct coupled and Nyquist sub-carriers. The power assigned to these bits is zero. The following formula is used to recursively compute a mean received PN symbol in step 225:

$$\mu_n = (1-\alpha)\mu_{n-1} + \alpha V_n, \qquad \text{Eq. 1}$$

where $\alpha = 1/N$; $\mu_0 = 0$; $n = 1, \ldots, N$; and $V_n$ = received symbol.

The fast retrain method proceeds as follows. In step 230, the DSP 90 generates a reference PN sequence. Next, the DSP 90 aligns the received PN sequence with the reference PN sequence generated in step 230. Having previously adjusted system clocks in association with timing recovery and aligned the received and reference PN sequences, the fast retrain method transforms the result from the time domain to the frequency domain by applying a Fourier transform to the received PN sequence in step 240.

The xDSL modem unit continues the fast retrain by loading the $B_i$ table in step 245. Next, in step 250, the system identifies the closest stored profiled given the system coefficients loaded in step 245. In step 255, a verification check may be performed to ensure that the closest profile available in memory is suitable. If the verification in step 255 determines that the closest stored profile is adequate, the DSP 90 continues with step 265, where the chosen profile coefficients are loaded into a buffer. Having loaded the chosen profile coefficients in step 265, the chosen profile coefficients are applied in step 270.

The DSP 90 verifies a successful fast retrain of the system by verifying that the data rate and the SNR of the resulting system configuration meet predetermined thresholds. As illustrated, the verification is performed in step 275. If either the verification of step 275, or the rejection decision in step 255 indicate that a full system initialization is in order, the fast retrain method transfers processing to step 110 of FIG. 3 and a full system initialization is performed. If the data rate and SNR verification performed in step 275 indicate that the system has been successfully configured for data mode, the DSP 90 informs xTU-R 57 that it is ready to enter data transfer mode in step 280. The DSP 90 then terminates the full retrain procedure by performing step 165, designated, "stop."

DMT Fast Retrain Method for DSL Modem Power Reduction

Figure 5A:
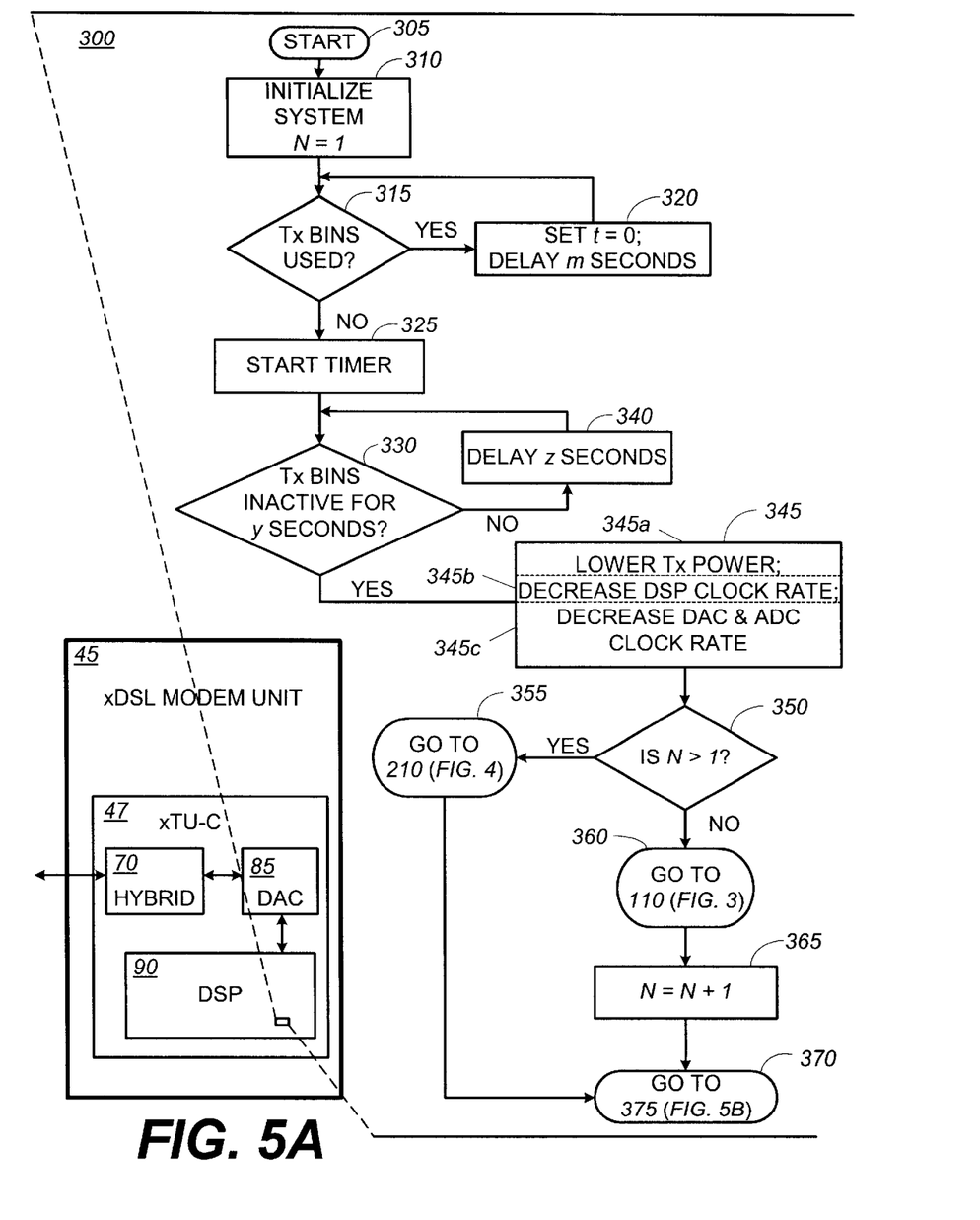
FIGS. 5A and 5B illustrate the xDSL modem of FIG. 3 capable of performing a fast retrain method for reducing power consumption in the xDSL modem.
Figure 5B:
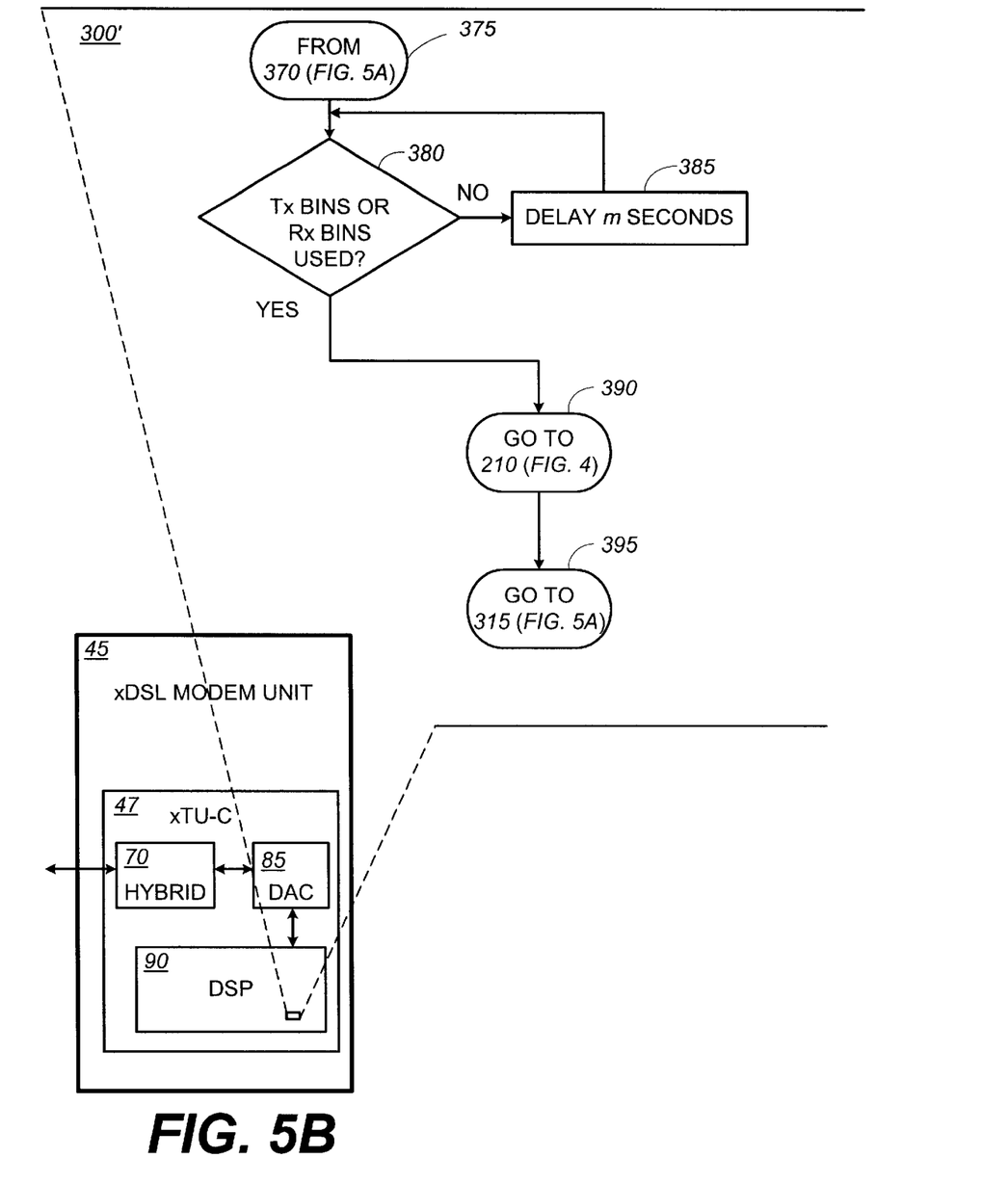

Having described a system and methods for performing a full system initialization, storing system profiles, and a fast retrain with regards to FIGS. 3 and 4, reference is now made to FIGS. 5A and 5B, which illustrate a method for reducing power dissipation in the line driver (see hybrid 70 of FIG. 2) of a xTU-C 47.

Method 300 for reducing power dissipation in a central office located xDSL modem unit 45 may be executed by DSP 90. Method 300 begins with step 305, designated, "start." Method 300 initializes system variables and resets a counter in step 310. Next, in step 315 the DSP 90 may be configured to determine if the transmit channel bins in a DMT modulated DSL system are being used to transmit DSL service information to the xTU-R 57 (see FIG. 2). If the determination in step 315 is positive, DSP 90 may be configured to delay a predetermined amount of time prior to repeating step 315 as illustrated in step 320 of FIG. 5A. It will be appreciated by those skilled in is the art that the predetermined delay variable in step 320 may be fixed (read and applied from a read only memory (ROM) by DSP 90) or may be implemented in any of a number of known user-adjustable circuits that may be coupled with DSP 90. As by way of example, the delay of step 320, as well as other delays used in the methods of the present invention may be implemented via a discrete capacitor and an adjustable potentiometer.

If the determination in step 315 is negative, that is, the downstream bins are not currently in use, the DSP 90 may be configured to perform step 325, where a timer is started. Next, in step 330, DSP 90 can be configured to determine if the downstream data transmission bins have been inactive for a predetermined amount of time by comparing the timer started in step 325 with a predetermined threshold. If it is determined that the downstream data transmission has been idle for only a brief period of time, DSP 90 may be configured to delay for a predetermined duration as illustrated in step 340, prior to repeating the determination of step 330. If DSP 90 determines in step 330 that the downstream data transmission has been unused for the prescribed duration, DSP 90 may continue by adjusting performance parameters within xTU-C 47 as illustrated in step 345. For example, the transmit channel power may be reduced by decreasing the magnitude of the supply voltage provided to the line driver in the hybrid 70. It is significant to note that step 345 is further illustrated with three exemplary functions: 345a, designated, lower transmit power; 345b, designated, decrease the DSP 90 clock rate; and 345c, designated, decrease the DAC and ADC sampling clock rate. Either of the aforementioned functions may be adjusted to decrease power consumption within xTU-C 47. Either of the aforementioned functions will be readily recognized by those skilled in the art, as such, a description detailing how to adjust transmit power and decrease clock rates is not required wherein.

Having performed either or all of the aforementioned power reducing techniques in xTU-C 47 the fast retrain method continues by determining if a previous fast retrain has been previously performed by the DSP 90 in step 350. If the determination in step 350 is affirmative, DSP 90 transfers processing to step 210 of the fast retrain method illustrated and described in regard to FIG. 4. Next, in step 360, if the determination in step 350 is that this is the first fast retrain to be performed by the DSP 90 on the system, DSP 90 transfers processing to step 110 of the full retrain procedure as described in regard to FIG. 3. After the full retrain procedure has completed, DSP 90 may be configured to increase a counter as illustrated in step 365 to indicate that a fast retrain profile should be available in memory. Having increased the counter, DSP 90 may be configured to transfer processing to step 375 (see FIG. 5B) in step 370. It is important to note that if a fast retrain procedure was indicated in step 350, that once the fast retrain procedure was completed DSP 90 would continue method 300 for reducing power dissipation in xTU-C 47 by transferring processing via step 370 to step 375 illustrated in FIG. 5B.

Having described that portion of the power reduction method 300 associated with FIG. 5A, reference is now directed to FIG. 5B which illustrates that portion of the method 300 responsible for detecting and responding to DSL data activity. In this regard, method 300' starts with step 375, which illustrates the transition from that portion of the method 300 flowchart illustrated in FIG. 5A Having successfully transitioned into a reduced power mode, method 300 performs the monitoring loop illustrated in steps 380 and 385. In step 380, a determination is made if either transmit or receive bins are being used to transfer data. If the determination is negative, a delay is performed in step 385 and the monitoring loop is repeated as illustrated in FIG. 5B. If it is determined in step 380 that either transmit or receive bins are in use, DSP 90 may be configured to perform a fast retrain of the system by transferring to method step 210 (see FIG. 4) as illustrated in step 390. Accordingly, referring back to FIG. 4 the DSL modem continues to perform the remaining steps of a fast retrain with the restored, predetermined downstream data transmit power. For instance, a system profile is retrieved in step 265, and in step 270 the profile is applied to the DSL modem to maintain the communications link, responsive to the increased power on the downstream bins. After the fast retrain is complete, DSP 90 may be configured to return processing to step 315 (see FIG. 5A) in order to monitor the DSL link for a period of inactivity of suitable duration in order to re-enter a reduced power mode as previously described.

DMT Stand-by Method for DSL Modem Power Reduction

Figure 6A:
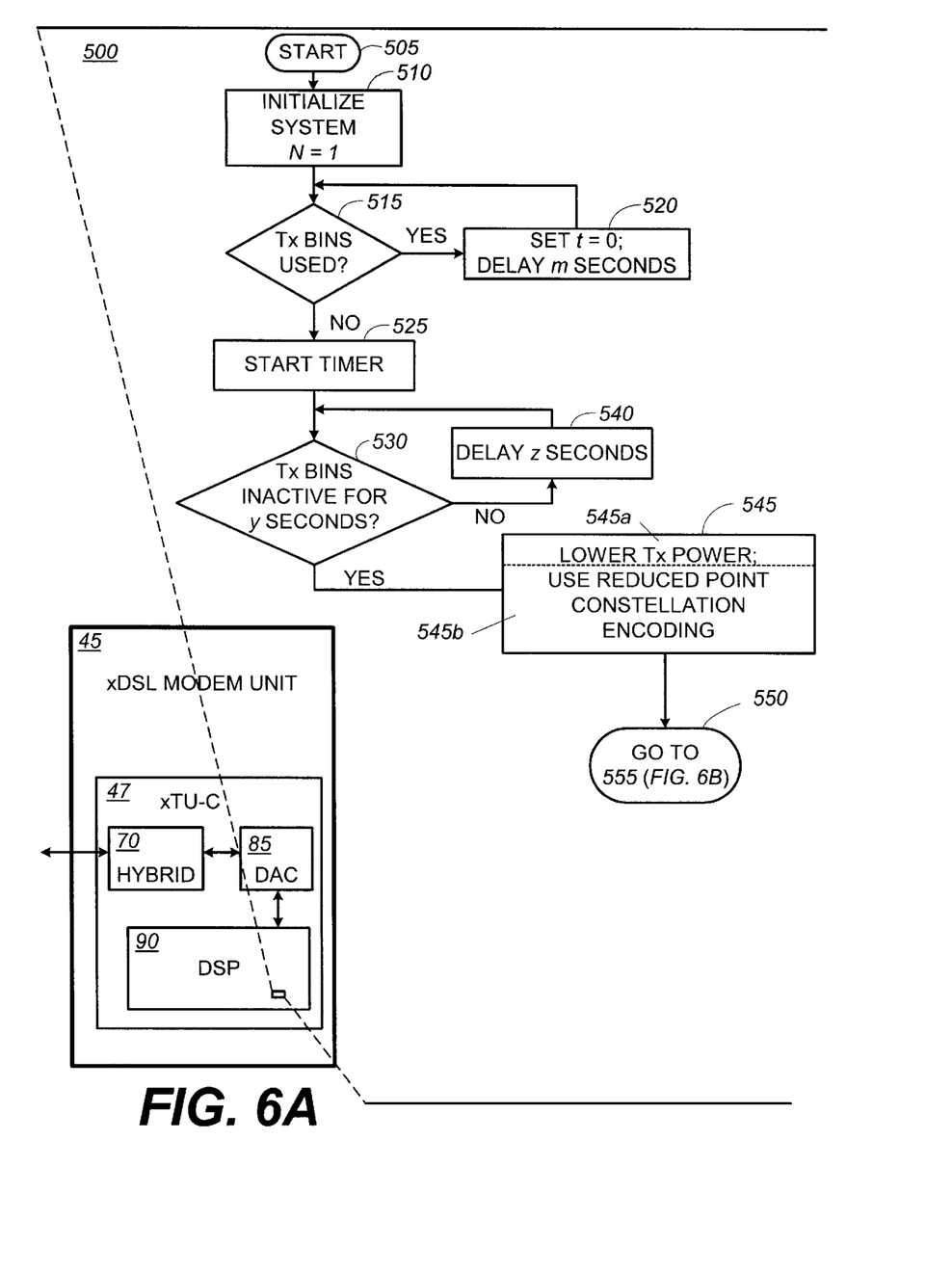
FIGS. 6A and 6B illustrate the xDSL modem of FIG. 3 capable of performing a second method for reducing power consumption in an xDSL modem that reflects a standby mode.
Figure 6B:
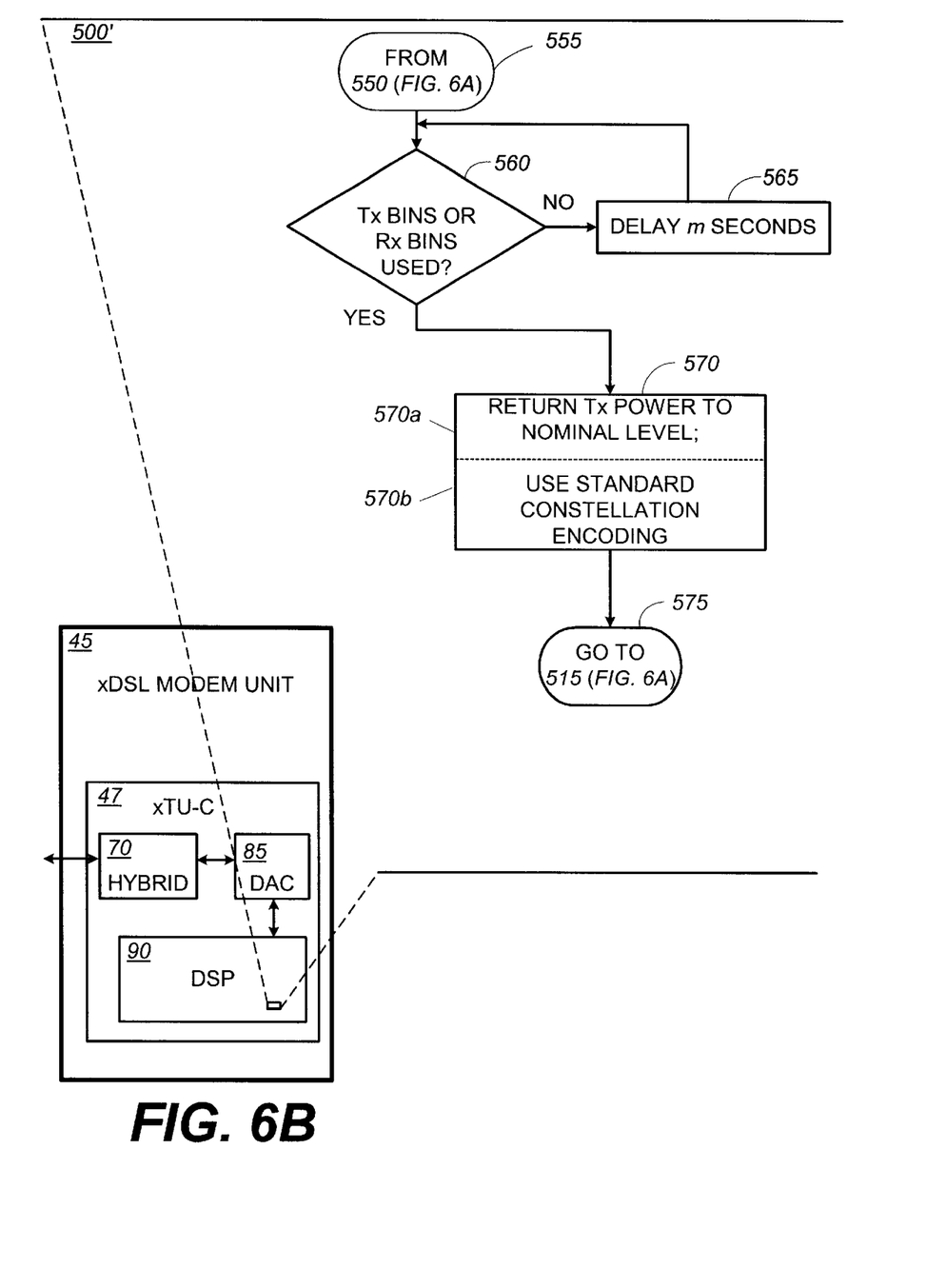

Having described a reduced power dissipation method suitable for periods of inactivity in the downstream data transmission direction capable of maintaining timing recovery for a DMT DSL communication system in regards to FIGS. 5A and 5B, reference is now directed to FIGS. 6A and 6B. In this regard, FIGS. 6A and 6B illustrate a second method for reducing power dissipation in the line driver (see hybrid 70 of FIG. 2) of a xTU-C 47.

Method 500 for reducing power dissipation in a xDSL modem unit 45 may be executed by DSP 90. Method 500 begins with step 505, designated, "start." Method 500 initializes system variables and resets a counter in step 510. Next, in step 515 the DSP 90 may be configured to determine if the transmit channel bins in a DMT modulated DSL system are being used to transmit DSL service information to the xTU-R 57 (see FIG. 2).

If the determination in step 515 is positive, DSP 90 may be configured to delay a predetermined amount of time prior to repeating step 515 as illustrated in step 520 of FIG. 6A. It will be appreciated by those skilled in the art that the predetermined delay variable in step 520 may be fixed (read and applied from a read only memory (ROM) by DSP 90) or may be implemented in any of a number of known user-adjustable circuits that may be coupled with DSP 90. As by way of example, the delay of step 320, as well as other delays used in the methods of the present invention may be implemented via a discrete capacitor an adjustable potentiometer and a comparator.

If the determination in step 515 is negative, that is, the downstream bins are not currently in use, the DSP 90 may be configured to perform step 525, where a timer is started. Next, in step 530, DSP 90 can be configured to determine if the downstream data transmission bins have been inactive for a predetermined amount of time by comparing the timer started in step 525 with a predetermined threshold. If it is determined that the downstream data transmission has been idle for only a brief period of time, DSP 90 may be configured to further delay for a predetermined duration as illustrated in step 540, prior to repeating the determination of step 530.

If DSP 90 determines in step 530 that the downstream data transmission has been unused for the prescribed duration, DSP 90 may continue by notifying the remote DSL modem that it is initiating a transition from data transfer mode to a stand-by mode. The DSL modem initiating the transition to stand-by may communicate its intention to enter stand-by mode by transmitting a unique sequence in the data path or a specified signal in a communications channel established between the modem pair for similar modem control functions. The initiating modem may continue by adjusting performance parameters within xTU-C 47 as illustrated in step 545. It is significant to note that step 545 is further illustrated with two exemplary functions: 545a, designated, lower transmit power and 345b, designated, use reduced point constellation encoding. Either of the aforementioned functions may be adjusted to decrease power consumption within xTU-C 47. Either of the aforementioned functions will be readily recognized by those skilled in the art, as such, a description detailing how to adjust transmit power and decrease clock rates is not required herein.

Having performed either or all of the aforementioned power reducing techniques in xTU-C 47 the power reducing method 500 continues by transferring processing control to step 555 (see FIG. 6B) as illustrated in step 550.

Having described that portion of the power reduction method 500 associated with FIG. 6A, reference is now directed to FIG. 6B which illustrates that portion of the method 500 responsible for detecting and responding to DSL data activity. In this regard, method 500' starts with step 555, which illustrates the transition from that portion of the method 500 flowchart illustrated in FIG. 5A. Having successfully transitioned into a reduced power mode, method 500' performs the monitoring loop illustrated in steps 560 and 565. In step 560, a determination is made if either transmit or receive bins are being used to transfer data. If the determination is negative, a delay is performed in step 565 and the monitoring loop is repeated as illustrated in FIG. 6B. If it is determined in step 560 that either the transmit or receive bins are in use (e.a. downstream or upstream data is being transmitted) DSP 90 may be configured to cooperate with the AFE to return the transmit power level to a nominal performance level 570a and to return to using standard constellation encoding 570b as illustrated in step 570. Thus, the DSP may be configured to cooperate with the AFE to increase the power transmitted on downstream bins responsive to the detection of an upstream or downstream data transmission.

The DSL modem initiating the transition to data transfer mode from stand-by may communicate its intention to enter data transfer mode by sending a specified sequence in the reduced constellation encoded data path or it may transmit a signal in a communications channel established between the modem pair for similar modem control functions. After transitioning to data mode, DSP 90 may be configured to return processing to step 515 (see FIG. 6A) as illustrated in step 575 in order to monitor the DSL link for a period of inactivity of suitable duration in order to re-enter a reduced power mode as previously described.

Both the DMT fast retrain method illustrated in FIGS. 5A and 5B, as well as, the DMT stand-by mode illustrated in accordance with FIGS. 6A and 6B can be further augmented with method steps to verify the data transmission rate, as well as, the SNR of the downstream signal bins. These verifications may be added after return to a system configuration that supports data transmission mode. In addition, the stand-by mode supported by the power reduction method introduced with regard to FIGS. 6A and 6B may be further augmented by method steps designed to verify that upstream timing synchronization is maintained while in the reduced power mode.

The aforementioned methods for reducing power consumption in a DSL modem can be extended to DSL communications systems that use CAP or QAM modulation schemes as well. A method for implementing a stand-by mode along with a warm start in the context of a rate adaptive asymmetric DSL modem is disclosed in U.S. Pat. No. 5,852,630 to Langberg, et al. and assigned to the same assignee as the present application, is hereby incorporated by reference in its entirety. The method introduced in accordance with FIGS. 6A and 6B that created a stand-by mechanism for DSL modems that use DMT can be modified to apply the stand-by mode and the warm start disclosed in the '630 patent to reduce power consumption in DSL modems that use CAP or QAM data transfer schemes while maintaining timing between the DSL modem pair.

A method detailing increased reliability by performing timing recovery in an expanded bandwidth signal using CAP modulation is disclosed in U.S. Pat. No. 5, 991,336 to Scholtz, et al. and assigned to the same assignee as the present application, is hereby incorporated by reference in its entirety. The modified constellation encoding technique used in accordance with the method of FIGS. 6A and 6B can be modified to use the method of data transmission using the expanded bandwidth disclosed in the '336 patent to reduce power consumption in the line driver of a DSL modem while maintaining timing between the DSL modem pair. Accordingly, the digital signal processor may be configured to apply CAP/QAM and maintain timing synchronization by transmitting only band edge tones after detecting no data transmission for a predetermined time, The system and method for reduced power consumption in a DSL modem may be implemented in software, hardware, or in a combination thereof. In the preferred embodiments, the elements of the present invention are implemented in software that is stored in a memory device that works along with a digital signal processor in a communication device. However, the foregoing software may be stored on any computer readable media suitable for transport or for use by or in connection with any suitably compatible computer system. In the context of this application, a computer readable medium is an electronic, magnetic, optical, or other physical device or means that can store a computer program for use by or in connection with a computer related system or method.

The embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A digital subscriber line (DSL) Modem in a discrete multi-tone communication system comprising:

means for establishing a communications link with a remotely located compatible DSL modem responsive to current conditions on a communications channel;

means to generate and store a system profile representative of the current conditions on the communications channel, the system profile comprising a plurality of parameters;

means for detecting periods of no data transmission on downstream bins;

means to reduce the power transmitted on downstream bins responsive to the detection of no data transmission on downstream bins;

means for detecting upstream data transmission;

means to increase the power transmitted on downstream bins responsive to the detection of upstream data transmission; and means to retrieve and apply a system profile to the DSL modem to maintain the communications link responsive to the increased power on downstream bins.

2. The digital subscriber line modem of claim 1, further comprising:

means to measure a data transmission rate and a signal to noise ratio across select tones to determine if the applied system profile will support predetermined data transmission.

3. The digital subscriber line modem of claim 1, further comprising:

means to delay for a predetermined duration after detecting no data transmission on downstream bins before enabling the means to reduce the power transmitted on downstream bins.

4. The digital subscriber line (DSL) modern of claim 1, further comprising:

means to retrieve and apply a system profile to the DSL modem to maintain the communications link responsive to the reduced power on downstream bins.

5. The digital subscriber line (DSL) modem of claim 1, further comprising:

means to determine if an appropriate system profile exists to apply to the DSL modem to maintain the communications link responsive to the reduced power on downstream bins, the means to determine configured to initiate a full system initialization when no suitable profile exists.

6. The digital subscriber line modem of claim 1, wherein the means for detecting upstream data transmission is replaced by a means for detecting downstream data transmission.

7. A digital subscriber line (DSL) modem using the discrete multi-tone communication standard comprising:

an analog front end (AFE), said AYE operative to receive a multi-carrier input signal and transmit a multi-carrier output signal for communication to a remotely located DSL modem through the public switched telephone network, said AFE configured to adjust the output power in downstream bins;

a memory device operative to store a plurality of system profiles, the system profiles representative of transmission characteristics observed on a communication channel between the DSL modem and the remotely located DSL modem; and a digital signal processor (DSP), said DSP operative to perform a full system initialization, store the resulting system profile in the memory device following successful system initializations, said DSP responsive to a request to perform a fast retain of the DSL modem, wherein a fast retrain consists of identifying current transmission characteristics on the communication channel and selecting a previously stored system profile to configure the DSL modem, said DSP configured to cooperate with said AFE to reduce transmit power in downstream bins in response to periods of no data transmission activity between the DSL modem and the remotely located DSL modem, said DSP further configured to cooperate with said AFE to increase transmit power in downstream bits in response to an upstream data transmission.

8. The digital subscriber line modem of claim 7, wherein the digital signal processor is configured to measure a data transmission rate and a signal to noise ratio across select tones to determine if the applied system profile will support predetermined data transmission.

9. The digital subscriber line modem of claim 8, wherein the digital signal processor is configured to delay for a predetermined duration after detecting no data transmission on downstream bins before enabling the means to reduce the power transmitted on downstream bins.

10. The digital subscriber line modem of claim 8, wherein the digital signal processor is configured to operate with a reduced clock rate when the downstream transmit power is reduced.

11. The digital subscriber line modem of claim 8, wherein the analog front end is configured to apply a reduced rate sampling clock at a digital to analog converter and an analog to digital converter when no downstream data transmission is present.

12. A method for reducing power consumption in a digital subscriber line (DSL) modem using the discrete multi-tone communications standard comprising:

storing system profiles following successful system initializations;

detecting periods of inactivity on the downstream bins;

reducing the transmit power on the downstream bins;

performing a fast retrain of the DSL modem with the reduced downstream data transmit power;

maintaining an upstream data rate;

detecting an upstream data transmission;

increasing the transmit power on the downstream bins in response to the detected upstream data transmission; and performing a fast retrain of the DSL modem with a predetermined downstream data transmit power.

13. The method of claim 12, further comprising:

waiting for a predetermined duration after detecting no activity on the downstream bins.

14. The method of claim 12, further comprising:

measuring a data transmission rate and a signal to noise ratio across select tones to determine if the applied system profile will support predetermined data transmission.

15. The method of claim 12, further comprising:

determining if a system profile exists that is suitable to maintain a communications link responsive to the reduced power on downstream bins.

16. The method of claim 15, wherein if the determination is negative, the digital subscriber line (DSL) modem performs a full system initialization of the DSL modem.

17. The method of claim 12, wherein the steps of detecting an upstream data transmission and increasing the transmit power on the downstream bins are replaced by:

detecting a downstream data transmission;

increasing the transmit power on the downstream bins in response to detecting the downstream data transmission.

18. A digital subscriber line (DSL) modem in a discrete multi-tone communication system comprising:

means for establishing a communications link with a remotely located compatible DSL modem responsive to current conditions on a communications channel;

means for detecting periods of no data transmission on downstream bins;

means for generating reduced point constellation data encoding to reduce the power transmitted on downstream bins responsive to the detection of no data transmission on downstream bins;

means for detecting upstream data transmission; and means to apply standard constellation data encoding responsive to the detection of upstream data transmission.

19. The digital subscriber line (DSL) modem of claim 18, further comprising:

means to measure a data transmission rate and a signal to noise ratio across select tones to determine if the DSL modem will support predetermined data transmission.

20. The digital subscriber line modem of claim 18, further comprising:

means to delay for a predetermined duration after detecting no data transmission on downstream bins before enabling the reduced point constellation encoding means to reduce the power transmitted on downstream bins.

21. The digital subscriber line modem of claim 18, wherein the means for detecting upstream data transmission is replaced by a means for detecting downstream data transmission.

22. A digital subscriber line (DSL) modem comprising:

an analog front end (AFE), said AFE operative to receive an input signal and transmit an output signal for communication to a remotely located DSL modem through the public switched telephone network; and a digital signal processor (DSP), said DSP configured to encode downstream data transmissions with a reduced point constellation in response to periods of no data transmission activity between the DSL modem and the remotely located DSL modem, wherein the digital signal processor is configured to measure a data transmission rate and a signal to noise ratio across select tones to determine if the DSL modem will support predetermined data transmission.

23. The digital subscriber line modem of claim 22, Wherein the digital signal processor is configured to delay for a predetermined duration after detecting no data transmission before enabling a modified encoding scheme.

24. The digital subscriber line modem of claim 22, wherein the digital signal processor is configured to apply discrete multi-tone and enables a reduced point constellation encoding scheme after detecting no data transmission for a predetermined period of time.

25. The digital subscriber line modem of claim 22, wherein the digital signal processor is configured to apply CAP/QAM and maintains timing synchroization by transmitting only band edge tones after detecting no data transmission for a predetermined period of time.

26. The digital subscriber line modem of claim 22, wherein the digital signal processor is configured to apply CAP/QAM and maintains timing synchronization by transitioning to a stand-by mode after detecting no data transmission for a predetermined period of time.

27. The digital subscriber line modem of claim 22, wherein the digital signal processor is configured to operate with a reduced clock rate when no downstream data transmission is present.

28. The digital subscriber line modem of claim 22, wherein the analog front end is configured to apply a reduced rate sampling clock at a digital to analog converter and an analog to digital converter when no downstream data transmission is present.

29. A method for reducing power consumption in a digital subscriber line (DSL) modem using a standard data encoding scheme in data transfer mode comprising:
   detecting periods of no data transmission;
   generating a modified data encoding scheme responsive to the detection of no data transmission;
   detecting upstream data transmission; and
   applying standard data encoding responsive to the detection of upstream data transmission.

30. The method of claim 29, further comprising:
   waiting for a predetermined duration after detecting no data transmission activity.

31. The method of claim 30, further comprising:
   measuring a data Remission rate and a signal to noise ratio to determine if the digital subscriber line modern will support predetermined data transmission.

32. The method of claim 31, wherein if the determination is negative, the digital subscriber line (DSL) modem applies standard data encoding.

33. The method of claim 29, wherein the steps of detecting an upstream data transmission and applying standard constellation data encoding are replaced by:
   detecting a downstream data transmission; and
   applying standard constellation data encoding in response to detecting the downstream data transmission.

* * * * *